United States Patent [19]

Mueller et al.

[11] 4,269,721

[45] May 26, 1981

[54] DUST ABATEMENT WITH CALCIUM SULFATE

[75] Inventors: Klaus W. Mueller, Yonkers; Norman R. Olsen, Peekskill, both of N.Y.

[73] Assignee: Stauffer Chemical Company, Westport, Conn.

[21] Appl. No.: 106,322

[22] Filed: Dec. 21, 1979

[51] Int. Cl.³ .............................................. C09K 3/22
[52] U.S. Cl. ...................................... 252/88; 252/61; 252/381; 252/383; 252/385
[58] Field of Search ................... 252/88, 61, 381, 383, 252/385

[56] References Cited

U.S. PATENT DOCUMENTS

| | | | |
|---|---|---|---|
| 2,778,718 | 1/1957 | Hartmann | 252/385 X |
| 2,786,815 | 3/1957 | Buggisch et al. | 252/88 |
| 3,681,246 | 8/1972 | Lewer et al. | 252/88 |
| 3,687,135 | 4/1972 | Lewer et al. | 252/88 |

*Primary Examiner*—Mayer Weinblatt
*Attorney, Agent, or Firm*—Vivienne T. White

[57] ABSTRACT

A method of treating stored coal to prevent dusting and reduce moisture penetration of the coal, comprising forming a hardened crust of a hydrated calcium sulfate containing composition over the exposed surface of the coal pile. The calcium sulfate product produced from the fluid bed combustion of coal in the presence of limestone is particularly useful.

5 Claims, No Drawings

DUST ABATEMENT WITH CALCIUM SULFATE

BACKGROUND OF THE INVENTION

1. Field of the Invention

The invention relates to a method of treating stored coal to allay dusting during storage or handling and reducing moisture penetration of coal stored in the open atmosphere.

2. Prior Art

The exposed surface of stored coal, especially coal stored in the open atmosphere is subject to oxidation and weathering which can cause the physical disintegration and dusting especially during subsequent handling and transportation. This is particularly harmful to metallurgical coal which rapidly loses its swelling and other specific characteristics after a relatively brief open air storage period. Such coal will then have to be used as steam coal at a much lower value. The use of water on stockpiled coal to prevent dusting is objectionable in that weathering is accelerated, coal pile effluent increased, and the coal freezes in cold weather to such an extent as to render it difficult to handle.

Methods disclosed in the prior art for allaying the dusting of coal have generally involved the use of oils or aqueous mixtures of deliquescent chemicals such as calcium chloride, magnesium chloride and potassium carbonate. The low freezing point and hygroscopic action of the chemicals is said to keep the coal moist and thereby prevent dusting or freezing in the coldest weather. The use of chlorides can present corrosion problems to equipment with which the coal is contacted.

SUMMARY OF THE INVENTION

A novel and inexpensive means of preventing the dusting and moisture penetration of stored coal has been discovered. It has been found that a calcium sulfate containing composition from the fluid bed combustion of coal, when combined with water (hydrate) and spread over the exposed surface of stored piles of coal, forms a hardened protective crust thereon. The invention provides a means of protecting coal stored in stockpiles, and particularly in the open atmosphere from dusting and/or from moisture penetration (as by rain) without the necessity of maintaining a surface layer of moisture on the coal. A further benefit deriving from this invention is the reduction of coal pile effluent, containing leachate and suspended matter that comprises a source of pollution requiring extensive treatment before discharge.

DETAILED DESCRIPTION OF THE INVENTION

The calcium sulfate containing composition is a by-product of fluidized-bed coal combustion. In the fluidized-bed combustion process particles of limestone or dolomite (bed material) are held in dense suspension by streams of air passing through the bed. The bed is heated to about 870° C., and crushed and sized coal is injected into and mixed with the bed material and burned. The heat generated is transferred to steam tubes immersed in the bed by the moving particles. During the process an amount of granular limestone is continuously added to the bed, and spent bed material is continuously withdrawn depending on the firing rate.

The spent bed material is predominantly comprised of calcium sulfate and amounts of magnesium sulfate and other reaction products formed when the limestone or dolomite reacts with sulfur dioxide (released by the burning of the coal), and ash. Other calcium containing compositions, as for instance, formed in the sulfur dioxide scrubbing process, are also useful in the process of performing the invention. The calcium sulfate containing composition from such a scrubbing operation would, however, be heavily hydrated and would probably have to be roasted to render it useful in the disclosed process. Although, pure calcium sulfate can be used in the process disclosed herein, economical considerations make the calcium sulfate product, produced from the fluid bed combustion of coal in the presence of limestone a particularly useful source material for practicing the invention. The spent bed material, comprised primarily of a calcium sulfate containing composition, and containing some ash, has to be disposed of at some cost, generally to a landfill. As a by-product of coal combustion, calcium sulfate can therefore, be inexpensively obtained, used and again recovered in the subsequent combustion of stored coal.

It is preferable, in the practice of this invention to spread an aqueous mixture of the calcium sulfate over the exposed surface of the stockpiled coal. It is also possible, however, to spread the calcium sulfate over the exposed surface of the stored coal and thereafter spray the calcium sulfate with sufficient water to form the hardened protective layer of calcium sulfate.

An improvement in the strength and permeability characteristics of the crust formed by the calcium sulfate can be obtained by including fly ash, also obtainable as a by-product of fluidized bed combustion of coal, in the aqueous calcium sulfate slurry.

The hardened calcium sulfate protective crust formed over the coal pile, in the practice of this invention does not interfere with the subsequent handling or combustion of the protected coal. In addition, coal protected in this manner described, excludes air sufficiently to inhibit air oxidation of the coal and by presenting a light colored, reflective surface, lessens the dangers of spontaneous heating and combustion.

The preferred form of the calcium sulfate used to protect the stockpiled coal is the hemihydrate (sesquihydrate), $CaSO_4 \cdot \frac{1}{2}H_2O$. The calcium sulfate recovered from the bed generally has a particle size of up to about 1.3 cm. which is reduced to fines. The selection, blending and treatment of the fluidized bed and fly ash should be such as to maximize the fraction of $CaSO_4$ with this degree of hydration and the proportion of fines. Water added to the material should be at least that required to convert it to the dihydrate $CaSO_4 \cdot \frac{1}{2}H_2O$. If the material is applied as a slurry to the coal pile, a moderate amount of excess water facilitates handling and will not be deleterious to the integrity of the protective crust formed thereon. Care must be taken, however, to limit the time between forming the aqueous slurry of the calcium sulfate and depositing the slurry over the coal pile, or a lowered strength crust will result.

What is claimed is:

1. A method of allaying dusting and moisture penetration of stored coal comprising covering the stored coal with sufficient amount of an aqueous mixture of a calcium sulfate containing composition to form a hardened crust over the stored coal.

2. The method of claim 1 wherein the aqueous mixture contains fly ash.

3. The method of claim 1 wherein the calcium sulfate containing composition is deposited over the stored coal in dry form prior to wetting down the coal with sufficient water to form the hardened crust.

4. The method of claim 3 wherein the calcium sulfate containing composition contains fly ash.

5. The method of claim 1 wherein the calcium sulfate containing composition is the spent bed material of the fluid bed combustion of coal.

* * * * *

UNITED STATES PATENT AND TRADEMARK OFFICE
CERTIFICATE OF CORRECTION

PATENT NO. : 4,269,721

DATED : May 26, 1981

INVENTOR(S) : Klaus W. Mueller et al.

It is certified that error appears in the above-identified patent and that said Letters Patent are hereby corrected as shown below:

Col. 2, line 52, "$CaSO_4 \cdot 1/2H_2O$" should be -- $CaSO_4 \cdot 2H_2O$ --.

Signed and Sealed this

Twenty-fifth Day of August 1981

[SEAL]

Attest:

GERALD J. MOSSINGHOFF

Attesting Officer

Commissioner of Patents and Trademarks